US012570140B2

(12) United States Patent
Mahakali et al.

(10) Patent No.: US 12,570,140 B2
(45) Date of Patent: Mar. 10, 2026

(54) DUAL PURPOSE AIR DUCT

(71) Applicant: FCA US LLC, Auburn Hills, MI (US)

(72) Inventors: Uday K Mahakali, Novi, MI (US);
Sreekanth Surapaneni, Rochester
Hills, MI (US); **Arturo
Guzman-Magana, LaSalle (CA); Diego
Raul Ramirez Serrano**, San Juan del
Rio (MX)

(73) Assignee: FCA US LLC, Auburn Hills, MI (US)

( * ) Notice: Subject to any disclaimer, the term of this
patent is extended or adjusted under 35
U.S.C. 154(b) by 322 days.

(21) Appl. No.: 18/325,559

(22) Filed: May 30, 2023

(65) Prior Publication Data

US 2024/0399856 A1      Dec. 5, 2024

(51) Int. Cl.
B60K 11/08      (2006.01)
B60L 58/26      (2019.01)
B62D 25/20      (2006.01)

(52) U.S. Cl.
CPC ............ B60K 11/085 (2013.01); B60L 58/26
(2019.02); B62D 25/20 (2013.01)

(58) Field of Classification Search
CPC ....... B60K 11/085; B60K 11/08; B60L 58/26;
B62D 25/20
See application file for complete search history.

(56) References Cited

U.S. PATENT DOCUMENTS

| | | | | |
|---|---|---|---|---|
| 4,653,788 | A | * | 3/1987 | Di Giusto ............... B60R 19/48 |
| | | | | 296/180.1 |
| 5,490,572 | A | * | 2/1996 | Tajiri ........................ B60L 1/02 |
| | | | | 180/68.5 |
| 8,631,889 | B2 | * | 1/2014 | Begleiter .................. B60T 5/00 |
| | | | | 180/68.1 |
| 9,738,176 | B2 | | 8/2017 | Garfinkel et al. |
| 9,957,811 | B2 | | 5/2018 | Hucker et al. |
| 10,160,308 | B2 | * | 12/2018 | Chae ...................... B60K 11/08 |
| 10,351,181 | B2 | | 7/2019 | McKillen et al. |
| 12,115,850 | B2 | * | 10/2024 | Moradnia ............... B60R 19/48 |

FOREIGN PATENT DOCUMENTS

| | | |
|---|---|---|
| EP | 224654 A2 | 6/1987 |
| FR | 2918329 A1 | 1/2009 |
| FR | 3104124 A1 | 6/2021 |

* cited by examiner

*Primary Examiner* — John D Walters
(74) *Attorney, Agent, or Firm* — Jeremy J. Klobucar

(57)      ABSTRACT

A vehicle cooling air duct has an inlet to passively divert air
flow when the vehicle in is motion. An air diverter receives
the air flow from the inlet. The air diverter has a duct and a
deflector to simultaneously deliver the air flow to a rotor and
a target component, such as a battery pack.

17 Claims, 3 Drawing Sheets

DUAL PURPOSE AIR DUCT

FIELD

The present disclosure relates to automotive vehicles and, more particularly, to a dual purpose air duct for cooling components.

BACKGROUND

This section provides background information related to the present disclosure which is not necessarily prior art.

In automobiles, it is desirable to dissipate heat from various components. Thus, ram air, which is generated when the vehicle is moving, is utilized in passive operations to cool the various components. Various types of systems exist that provide air to the vehicle components, such as its rotors. With the advent of electric cars, systems have been designed to provide air to the battery packs for cooling purposes.

Also, other systems, such as liquid cooling, have been utilized to cool vehicle components. However, these increase the weight of the vehicle. Also, by adding multiple dedicated air ducts for each component leads to increased aerodynamic losses. Also packaging constraints hinder the designer to provide ram air to various components. Additionally, modifying the rotor by complex vane designs, increasing rotor surface area, wheel rim designs and slotted rotors can be expensive and may derogate vehicle aerodynamics.

SUMMARY

This section provides a general summary of the disclosure, and is not a comprehensive disclosure of its full scope or all of its features.

The present disclosure provides a system that is capable of simultaneously providing air to rotors and a targeted component, such as a vehicle battery pack. The present disclosure is a passive system that diverts air to the targeted component and the brake rotors. The present design provides cooling of two components with a single diverter. The present design may be combined with an aero shield or cover that is provided on the underside of a vehicle.

According to the disclosure, a vehicle cooling air duct system comprises an inlet to passively divert air flow when the vehicle is in motion. An air diverter receives an air flow from the inlet. The air diverter includes a duct and a deflector to simultaneously deliver the air flow to a rotor and a targeted component. The inlet may be molded into an underbody shield or cover. The diverter may be molded into a rear suspension underbody shield or cover. The diverter duct and deflector are adjacent to one another. The duct opening enables air passage through the deflector. Generally, a pair of inlets and a pair of diverters are included to provide air to both rotors as well as a battery pack. The inlet has a surface at an angle in the range of about 10° to 60° with respect to horizontal. Also, the duct has an inlet angle of about 75° to 90° with respect to horizontal. The deflector is at an angle of about 75° to 90° with respect to horizontal.

According to a second aspect of the disclosure, a vehicle air or aero shield or cover comprises a body for securing to a vehicle. The body includes an air diverter that receives an air flow from an inlet. The air diverter includes a duct and a deflector to simultaneously deliver the air flow to a rotor and a targeted component. The inlet is molded into an underbody shield or cover. The diverter is molded into the underbody shield or cover. The diverter duct and deflector are adjacent to one another. The duct opening enables air passage through the deflector. Generally, a pair of inlets and a pair of diverters are included to provide air to both rear rotors as well as a battery pack housing. The inlet has a surface at an angle in the range of about 10° to 60° with respect to horizontal. Also, the duct has an inlet angle of about 75° to 90° with respect to horizontal. The deflector is at an angle of about 75° to 90° with respect to a horizontal.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
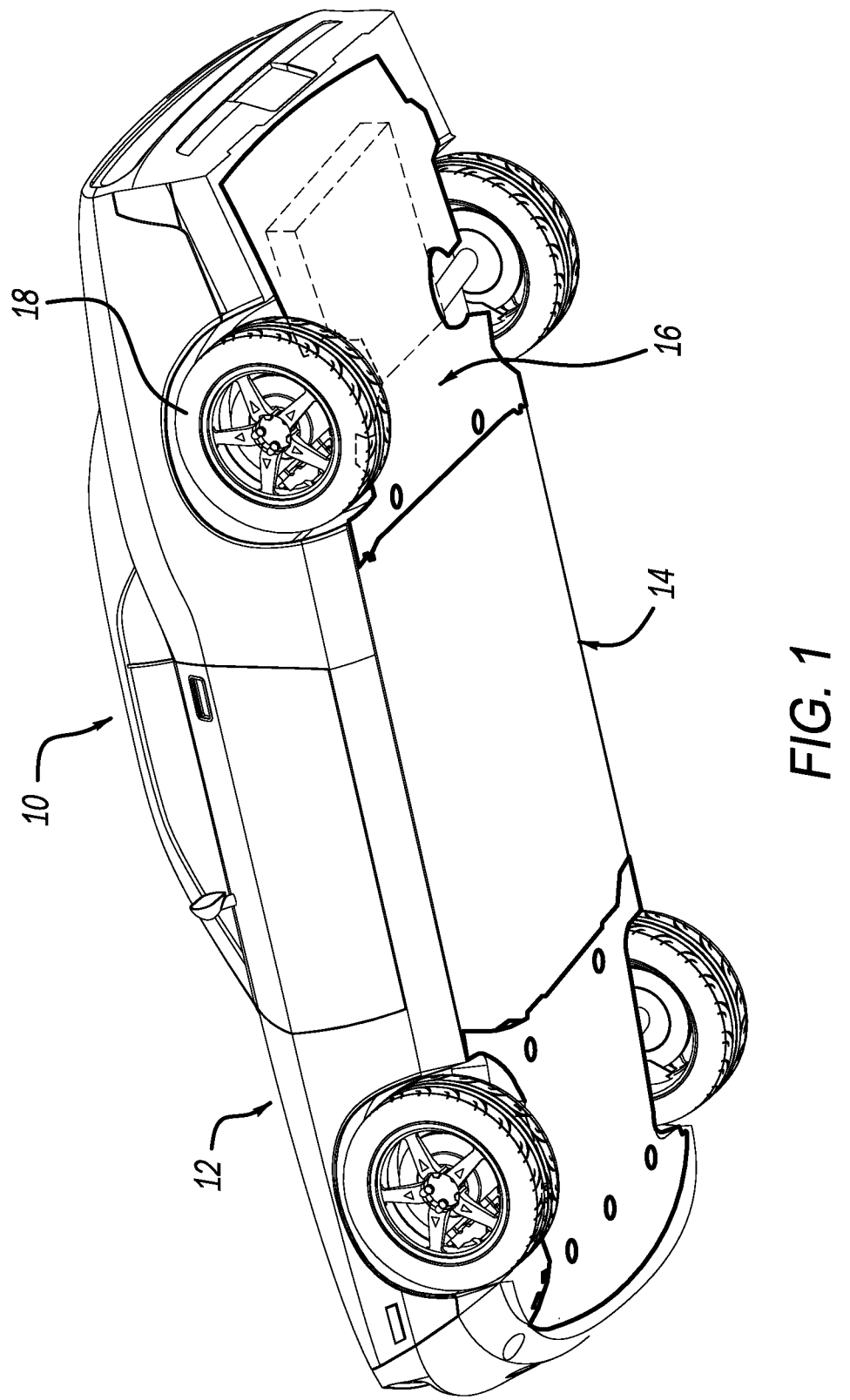
FIG. 1 is a perspective view of the underside of a vehicle.
Figure 2:
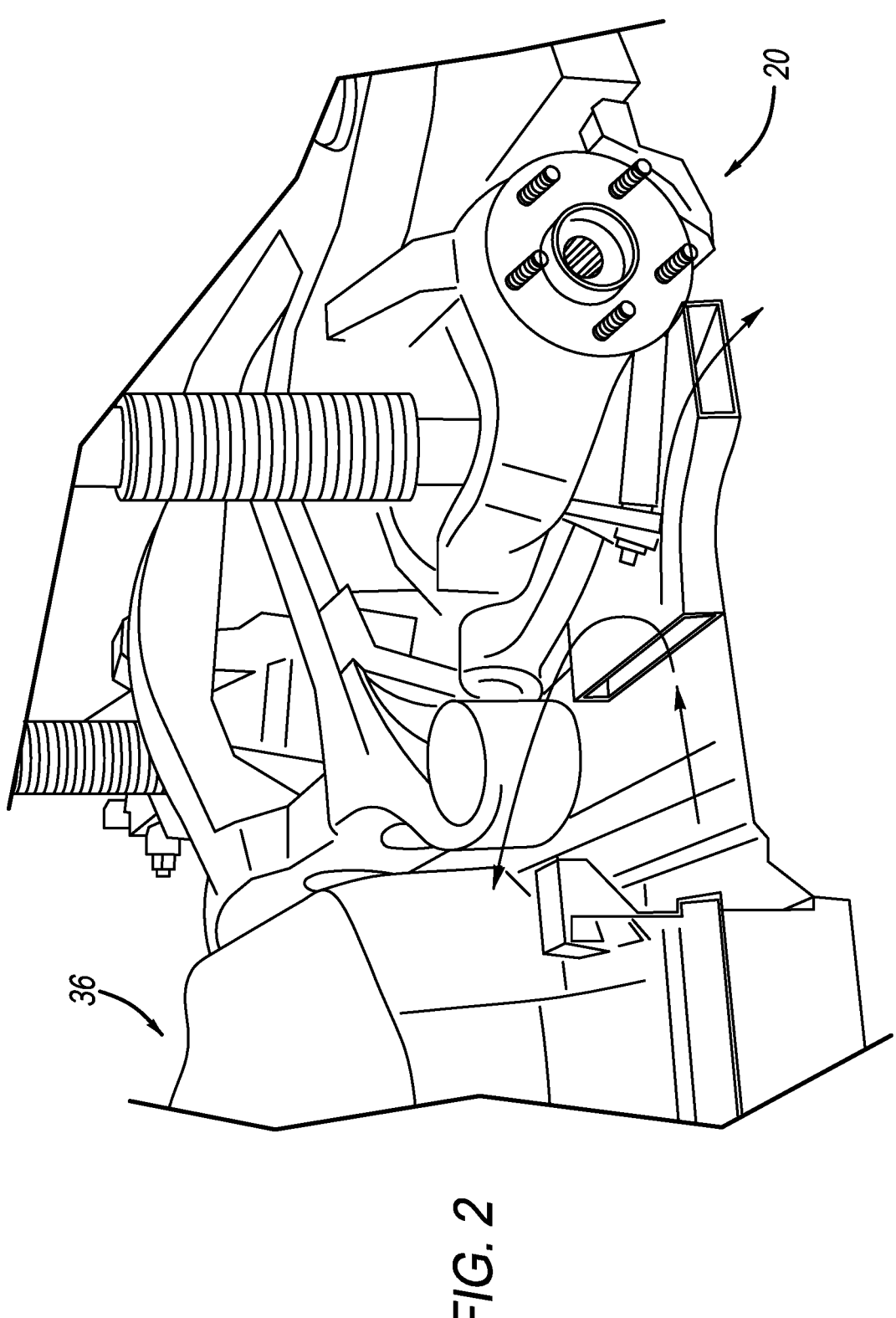
FIG. 2 is a schematic perspective view of a rear suspension of a vehicle.
Figure 3:
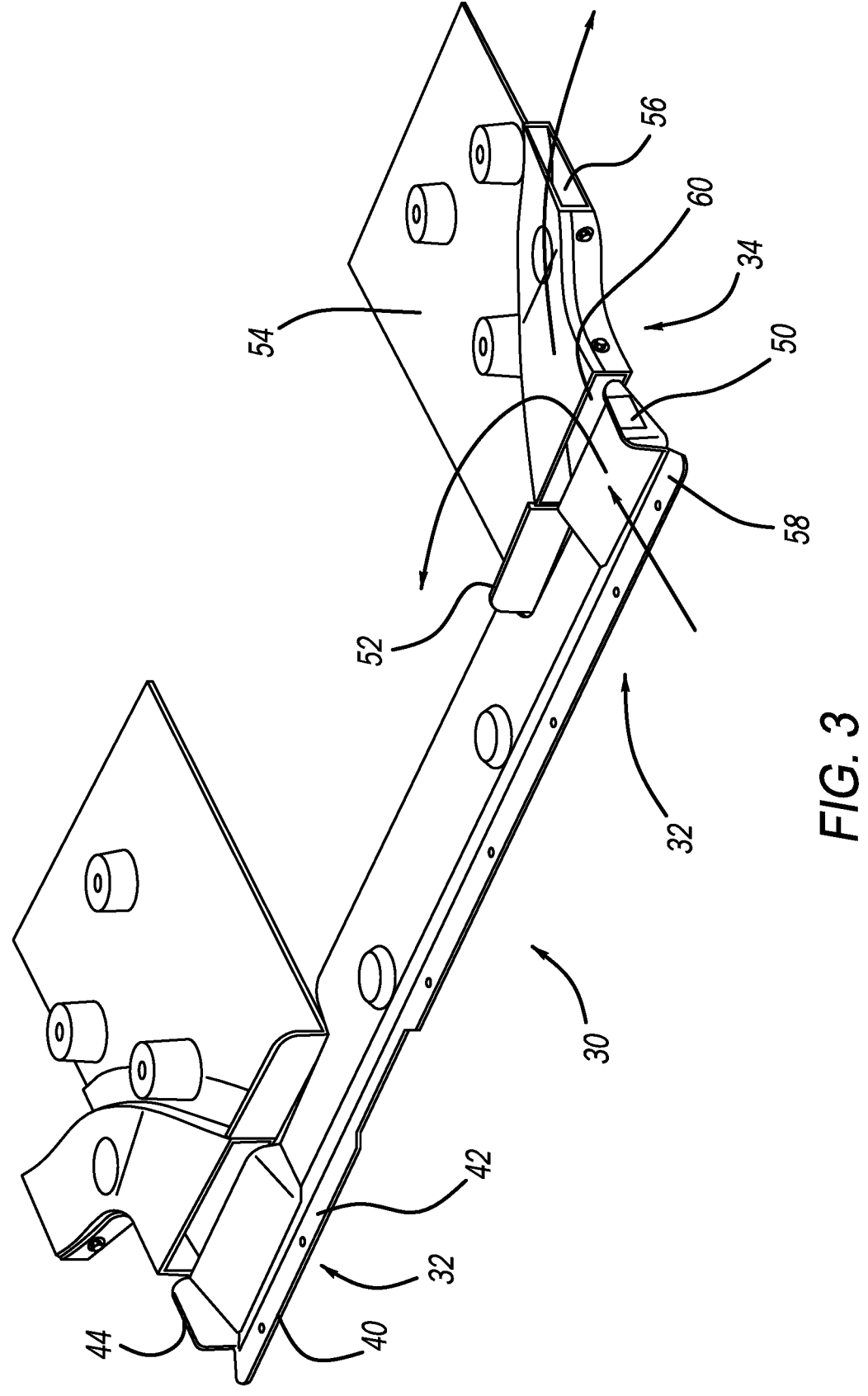
FIG. 3 is a perspective view of cooling air duct system.

Example embodiments will now be described more fully with reference to the accompanying drawings.

Turning to the figures, an automotive vehicle is illustrated and designated with the reference numeral 10. The vehicle includes a body 12 with an underside 14. The underside 14 includes an air or aero shield or cover 16 at the rear of the vehicle 10. The vehicle 10 includes wheels 18 that are secured onto the vehicle drive shaft via the brake rotors 20.

The air shield 16 may include a cooling air duct system 30. The cooling air duct system 30 includes an inlet 32 that passively diverts ram air flow when the vehicle is moving to an air diverter 34. The air diverter 34 diverts the flow from the inlet 32 to the brake rotors 20 as well as to a targeted component such as a vehicle battery pack 36.

The inlet 32 includes a scoop 40 or the like that directs the ram air flow towards an angled surface 42 of the inlet 32. A wall 44 may be on the side of the angled surface 42 to enhance flow towards the diverter 34. The angled surface 42 is angled with respect to horizontal at an angle between 10° to 60°. This creates a desired exit angle at the outlet of the angled surface 42. Thus, this exit angle enhances the delivery of air from the inlet 32 into the diverter 34. The angled surface 42 can have a desired width, larger than an air duct opening 60, to enable directing of the ram air to the diverter 34.

The diverter 34 includes a duct 50 and a deflector 52. The duct 50 passes through a body 54 of the diverter 34. The duct 50 provides a channel 56 to move the air flow from the inlet 32 towards the rotor 20. Thus, the air flow passed through the duct 50 enhances inlet cooling of the brake rotors 20. The duct 50 has a surface 58 that is aligned with the surface 42. The surface 58 is at the intake of the duct 50 and provides an intake angle for the duct 50. The intake angle is angled with respect to horizontal at an angle between 75° to 90°. This provides for the efficient transfer of the air flow through the duct 50 from the inlet 32 to the rotor 20.

The diverter also includes the deflector 52. The deflector 52 includes an aperture 60 that defines the intake opening of the duct 50. The aperture 60 is cut into the deflector 52 so that generally the deflector 52 has a portion above the aperture 60 as well as beside the aperture 60. Thus, the deflector 52 is on an angle of between 75° to 90° with respect to horizontal but generally is perpendicular to it. Thus, as the air flow exits the inlet 32 toward the duct 50, a portion of the air flow is deflected towards a target component such as a battery pack 36. Thus, the diverter 34 moves the air flow simultaneously to the rotors 20 as well as to a target component, such as the battery pack 36. Accordingly, the diverter 34 cools two components at the same time.

While the cooling air duct system 30 illustrates air flow directed toward a battery pack 36, it can divert the air flow to a targeted component such as an electrical component that may be part of an extensive control system. The air duct system 30 is illustrated to provide air flow to a targeted component such as a high voltage battery pack 36.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle cooling air duct comprising:
an inlet for passively diverting air flow when the vehicle is in motion; and
an air diverter for receiving an air flow from the inlet, the air diverter including a duct for delivering the air flow to a brake rotor and a deflector for deflecting air from the inlet to a battery,
wherein the deflector is arranged adjacent to an opening of the duct and deflects the air flow in a direction that is opposite to a direction of the air flow that passes through the opening of the duct.

2. The vehicle cooling air duct of claim 1, wherein the inlet is molded into an underbody shield or cover.

3. The vehicle cooling air duct of claim 1, wherein the diverter is molded into an underbody shield or cover.

4. The vehicle cooling air duct of claim 1, wherein the diverter duct and deflector are adjacent one another.

5. The vehicle cooling air duct of claim 1, further comprising a pair of inlets and a pair of diverters.

6. The vehicle cooling duct of claim 1, wherein the inlet has an exit angle of 10° to 60°.

7. The vehicle cooling duct of claim 1, wherein the duct has an inlet angle of 75° to 90° with respect to horizontal plane.

8. The vehicle cooling duct of claim 1, wherein the deflector is at an angle of about 75° to 90° with respect to a horizontal plane.

9. A vehicle air or aero shield or cover comprising:
a body for securing to an underside of the vehicle;
an air diverter that receives an air flow from an inlet;
the air diverter includes a duct that delivers the air flow to a rotor, and a deflector for deflecting air from the inlet to a targeted component,
wherein the deflector is arranged adjacent to an opening of the duct and deflects the air flow in a direction that is opposite to a direction of the air flow that passes through the opening of the duct.

10. The vehicle air or aero shield or cover of claim 9, wherein the inlet is molded into the body.

11. The vehicle air or aero shield or cover of claim 9, wherein the diverter is molded into the body.

12. The vehicle air or aero shield or cover of claim 9, wherein a diverter duct and deflector are adjacent one another.

13. The vehicle air or aero shield or cover of claim 9, wherein a duct opening enables the air flow possible through the deflector.

14. The vehicle air or aero shield or cover of claim 9, further comprising a pair of inlets and a pair of diverters.

15. The vehicle air or aero shield or cover of claim 9, wherein the inlet has an exit angle of 10° to 60° with respect to horizontal.

16. The vehicle air or aero shield or cover of claim 9, wherein the duct has an inlet angle of 75° to 90° with respect to horizontal.

17. The vehicle air or aero shield or cover of claim 9, wherein the deflector is at an angle of about 75° to 90° with respect to horizonal.

* * * * *